Patented Apr. 6, 1954

2,674,537

UNITED STATES PATENT OFFICE 2,674,537

PRESERVATION OF CITRUS FRUITS

Edwin F. Hopkins, Lake Alfred, and Kenneth W. Loucks, Winter Haven, Fla.

No Drawing. Application June 25, 1951,
Serial No. 233,486

11 Claims. (Cl. 99—222)

This invention relates to a method and compositions for the preservation of citrus fruits and particularly to a method and compositions whereby the phytotoxic action of phenolic compounds useful in the control of decay and molding of citrus fruits, such as the phenylphenols and chlorinated phenols, is prevented.

A serious limitation to the use of aqueous solutions of phenolic compounds as dip treatments for the control of decay in citrus fruits is its tendency to cause chemical peel burn. When concentrations of the fungicide high enough to prevent stem-end rot and mold infections are used, severe burning of the fruit peel may occur. Although this does not affect the internal quality of the fruits, an unsightly appearance results which renders them unmarketable. For this reason concentrations of the chemical greater than 1.2 per cent have seldom been used in such treatments and even this concentration is not always safe. In fact, even when the fruit was rinsed following treatment, peel burn on lemons has been reported with concentrations as low as 0.5 per cent.

We have now found that by the incorporation of hexamine (hexamethylene tetramine) in aqueous solutions of water-soluble alkali metal salts of fungicidal phenylphenols and chlorophenols, for example, the sodium salts of o-phenylphenol (Dowicide A), 2,4,5-trichlorophenylphenol (Dowicide B), and chloro-2-phenylphenol (Dowicide C), peel burn of citrus fruits treated with such solutions is eliminated even when the treating solutions contain concentrations of the phenolic compound as high as 3%.

The hexamine may be added to the solution as such or formed therein by the addition of the proper proportions of ammonium hydroxide and formaldehyde solution.

The table is an example of the application of the principles of the invention to the treatment of oranges. The data were obtained from oranges held in storage for three weeks. The mean values for eight tests are presented in the table. In all eight tests the oranges were subjected to the usual ethylene coloring treatment for from 60 to 90 hours before receiving the fungicidal dip. This coloring treatment hastens the onset of stem-end rot decay and makes its control more difficult. As shown in the table good protection against decay was also afforded by Dowicide A used alone but in all cases the fruit was badly burned and of no value.

Table

| Treatment | Total Decay, Percent | Marketable Fruit, Percent |
|---|---|---|
| Controls, untreated | 24.4 | 75.6 |
| Dowicide A, 2% | 4.9 | 0. |
| Dowicide A, 2%+Hexamine, 1% | 3.7 | 96.3 |

The method and compositions of the invention have also been successfully applied in the prevention of injury to other citrus fruits, such as tangerines and limes.

In no case has hexamine failed to prevent peel burn even under severe conditions of treatment, namely, when the fruit was dipped in 2 per cent Dowicide A for 2 minutes at 100° F. and not rinsed after treating. In one test a solution containing 3 per cent Dowicide A and 1.5 per cent hexamine was used as a dip and the treatment made as just described. No trace of burn was produced on oranges so treated while 1.5 per cent Dowicide A without the counteractant caused severe burn on the same lot of fruit.

In general, concentrations of from about 1 per cent to about 2 per cent of hexamine are effective in preventing burn by solutions containing from about 1 per cent to about 3 per cent of phenolic compound. Other substances, such as buffers and wetting agents well known in the art may be added to the solutions.

It will be seen that the invention provides a method and compositions for treating citrus fruits with high enough concentrations of sodium orthophenylphenate and similar phenolic compounds to effectively control decay caused by stem-end rot and mold fungi without burning the fruit peel and destroying the market value of said fruit.

We claim:

1. Composition for treating citrus fruits for controlling decay during the post-harvest period comprising an aqueous solution of a water-soluble alkali metal salt of a fungicidal phenol and hexamethylene tetramine.

2. Composition for treating citrus fruits for controlling decay during the post-harvest period comprising an aqueous solution of from about 1% to about 3% of a water-soluble alkali metal salt of a fungicidal phenol and from about 1% to about 2% of hexamethylene tetramine.

3. Composition for treating citrus fruits for controlling decay during the post-harvest period comprising an aqueous solution of the sodium salt of o-phenylphenol and hexamethylene tetramine.

4. Composition for treating citrus fruits for controlling decay during the post-harvest period comprising an aqueous solution of the sodium salt of 2,4,5-trichlorophenol and hexamethylene tetramine.

5. Composition for treating citrus fruits for controlling decay during the post-harvest period comprising an aqueous solution of the sodium salt of chloro-o-phenylphenol and hexamethylene tetramine.

6. A process for controlling decay of citrus fruits during the post-harvest period which comprises treating citrus fruits with an aqueous solution containing a water-soluble alkali metal salt of a fungicidal phenol and hexamethylene tetramine whereby phytotoxic action of the phenol is prevented.

7. A process for controlling decay of citrus fruits during the post-harvest period which comprises treating citrus fruits with an aqueous solution containing from about 1% to about 3% water-soluble alkali metal salt of a fungicidal phenol and from about 1% to about 2% hexamethylene tetramine whereby phytotoxic action of the phenol is prevented.

8. A process for controlling decay of citrus fruits during the post-harvest period which comprises treating citrus fruits with an aqueous solution containing the sodium salt of o-phenylphenol and hexamethylene tetramine.

9. A process for controlling decay of citrus fruits during the post-harvest period which comprises treating citrus fruits with an aqueous solution containing the sodium salt of 2,4,5-trichlorophenol and hexamethylene tetramine.

10. A process for controlling decay of citrus fruits during the post-harvest period which comprises treating citrus fruits with an aqueous solution containing the sodium salt of chloro-o-phenylphenol and hexamethylene tetramine.

11. The method of preventing phytotoxic action of aqueous solutions of water-soluble alkali metal salts of fungicidal phenols which comprises the admixture of hexamethylene tetramine therewith.

References Cited in the file of this patent

UNITED STATES PATENTS

| Number | Name | Date |
|---|---|---|
| 2,054,392 | Sharma | Sept. 15, 1936 |
| 2,374,210 | Kalmar | Apr. 24, 1945 |

FOREIGN PATENTS

| Number | Country | Date |
|---|---|---|
| 360,405 | Great Britain | Oct. 30, 1931 |
| 406,653 | France | Dec. 13, 1909 |
| 893,514 | France | Jan. 31, 1944 |
| 1,011,387 | France | Apr. 2, 1952 |

OTHER REFERENCES

"Chemistry of Insecticides, Fungicides, and Herbicides," second edition, September 1948, by Frear, page 262.